Dec. 19, 1961   R. B. STANLEY ET AL   3,013,591
PRESSURE FILLER HEAD OF PRESSURE-DISPENSED
PRODUCTS AND METHOD
Filed Dec. 4, 1959   3 Sheets-Sheet 1

INVENTORS
RICHARD B. STANLEY
PAUL M. WOESSNER
BY
Mann, Brown and McWilliams
ATTORNEYS

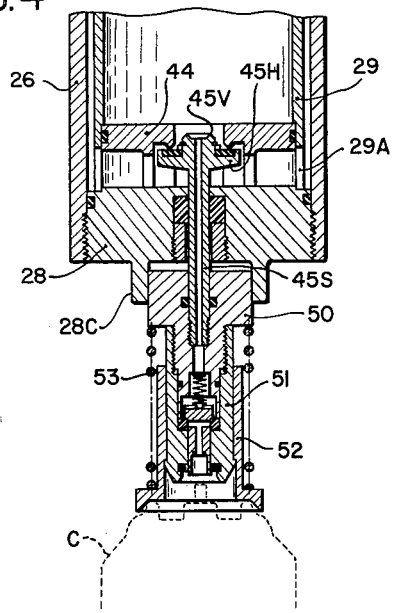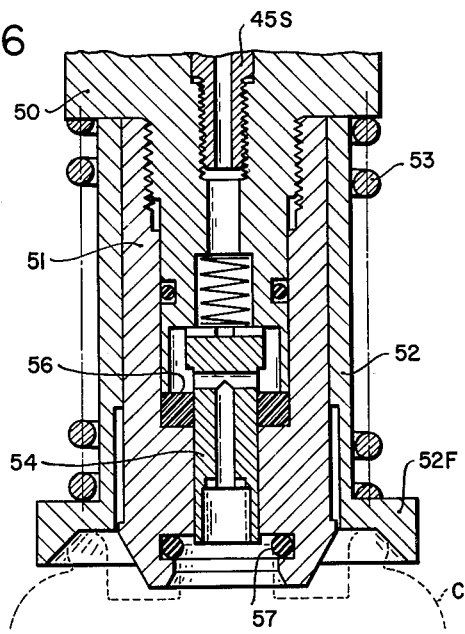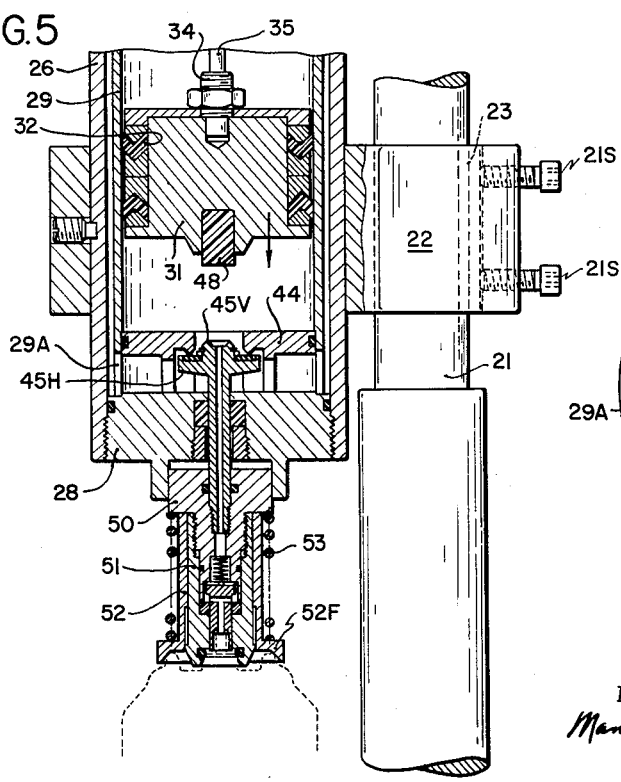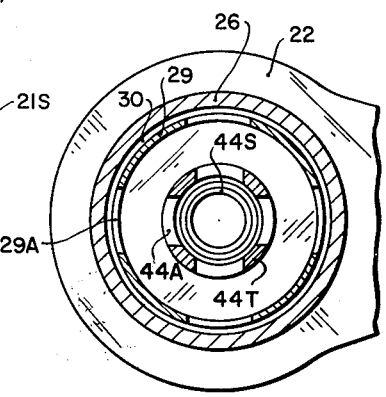
INVENTORS
RICHARD B. STANLEY
PAUL M. WOESSNER
BY Mann, Brown and McWilliams
ATTORNEYS

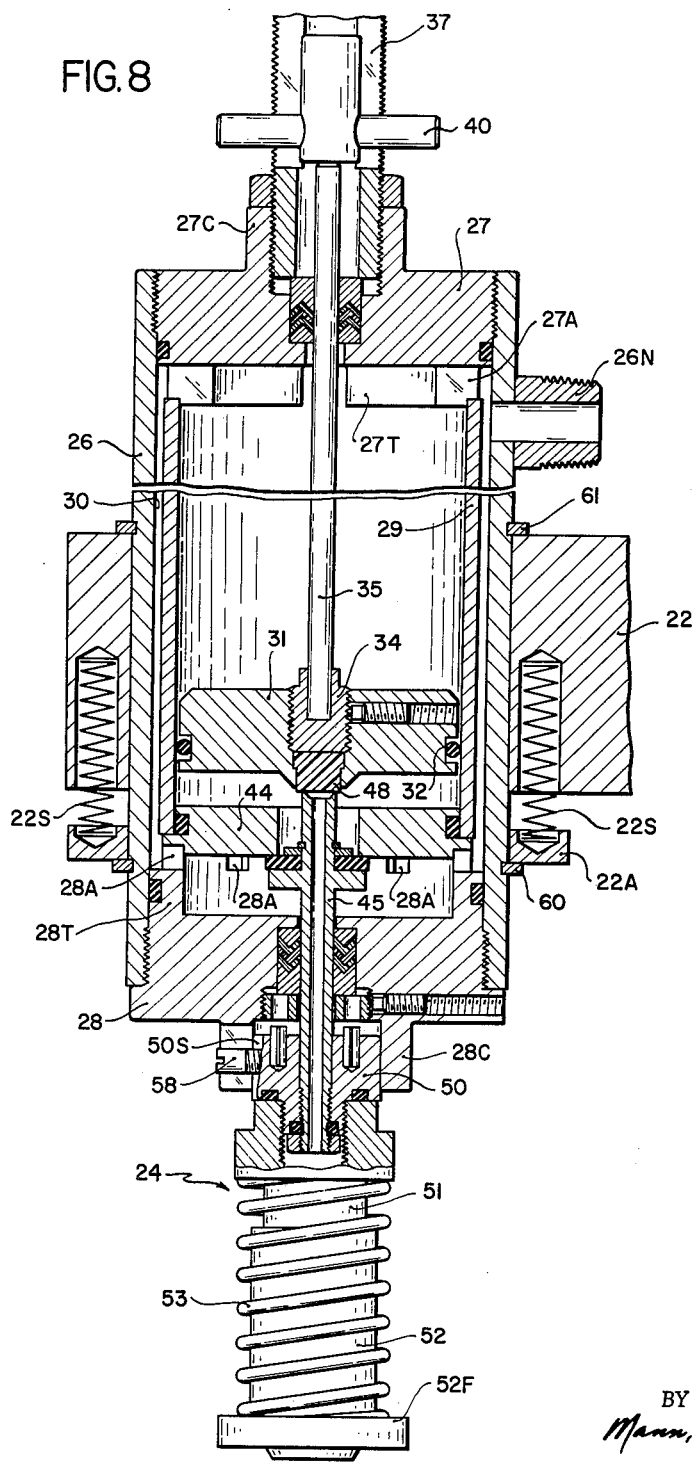

United States Patent Office 3,013,591
Patented Dec. 19, 1961

3,013,591
PRESSURE FILLER HEAD OF PRESSURE-DISPENSED PRODUCTS AND METHOD
Richard B. Stanley, Park Ridge, Ill., and Paul M. Woessner, Lathrup Village, Mich., assignors, by mesne assignments, to The Kartridg Pak Co., Chicago, Ill., a corporation of Iowa
Filed Dec. 4, 1959, Ser. No. 857,418
16 Claims. (Cl. 141—3)

This invention relates to the pressure filling of pressure-dispensed products into containers through the pressure valve of the container and, more particularly, is concerned with an arrangement wherein the product supply line pressure provides the control energy for actuating the pressure filler head.

In this field the filler head construction should be simple and durable to withstand the rigors of high-frequency operation over an extended lifetime; it should be capable of repeatedly delivering accurately metered quantities of pressurized volatile liquid into a container without spillage or drippage and without damage to the container or its valve; and it should be capable of high-speed operation.

The principal object of the invention is to provide a pressure filler head having the above characteristics.

Another object is to provide a filler head having facilities for making a ready adjustment in the size of charge to be delivered.

Still another object is to provide a method of pressure filling a pressure-dispensed product in which the pressure of the product supply line is the driving force for the metering and discharging functions.

Briefly, the invention discloses a pressure filler head or dispenser comprising a cylinder having product under pressure supplied continuously to opposite ends thereof, a piston having opposed faces of differential area operable in the cylinder and defining a metering chamber at the lower end of the cylinder, a discharge passage communicating with the metering chamber, and a container-actuated movable valve for terminating supply of product from the source through the discharge passage of the head and for discharging the product charge in the metering chamber of the cylinder.

The pressure of the product acting on the opposed piston faces of differential area drives the piston upwardly in the cylinder to draw a metered charge of product into the metering chamber whereupon the movable valve isolates this charge for delivery from the metering chamber to the container. Pressure of the product on the opposite face of the piston drives the piston downwardly to pressure discharge the product from the metering chamber.

Other objects and advantages will become apparent during the course of the following disclosure.

In the accompanying drawings forming a part of this specification and in which like numerals are employed to designate like parts throughout the same:

FIGS. 4 and 5 are corresponding fragmentary vertical sectional views through the adapter and the lower end of the pressure filler head illustrating successive stages in the container-filling operation of the device;

FIG. 6 is a sectional view through the adapter unit corresponding generally to FIG. 2 but illustrating the parts thereof in their container-filling position of FIG. 5;

FIG. 7 is a detailed fragmentary bottom horizontal sectional view through the discharge outlet region of the metering chamber; and FIG. 8 is a vertical sectional view of a pressure filler head of a modified construction illustrated in discharged condition.

Figure 1:
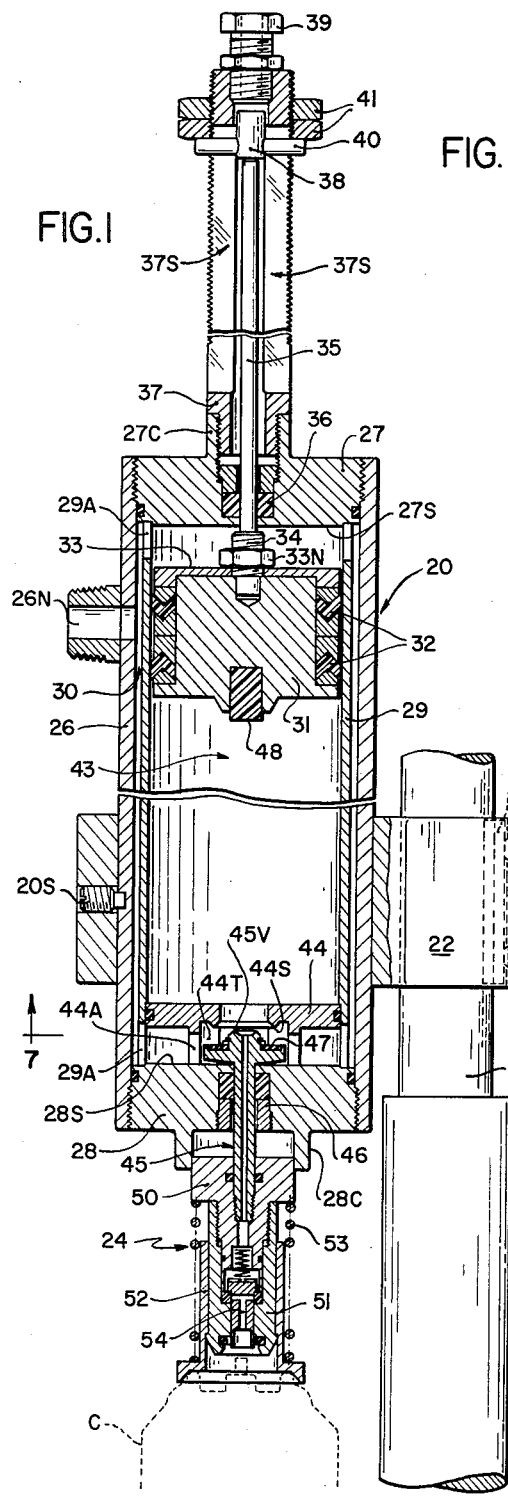
FIG. 1 is a vertical sectional view of the pressure filler head illustrated in its loaded condition.

Referring now to the drawings, for purposes of illustrative disclosure a pressure filler head or dispenser unit constructed in accordance with this invention is shown in its entirety in FIG. 1 wherein, as designated at 20, it is mounted on a vertically reciprocable operating post 21 by means of an aluminum bracket 22 encircling and fixed to the head by a lock screw 26S and encircling and fixed to the post by cap screws 21S acting against a key 23 engaged internally between the post and bracket.

The filler head includes a container-engaging adapter, designated generally as 24, arranged to mate with the top of the container. In the present arrangement, the adapter provides a positive shut-off for preventing flow from the head in the absence of engagement with a container at the fill position. The interaction of the adapter against the container C and its valve triggers the pressure discharge of a metered quantity of liquid from the filler head and the construction of the adapter is such that it first conditions the filler head for its metered discharge and thereafter completes a supply path through the discharge passage and container valve from the head to the container.

The pressure filler head has a tubular main housing or casing 26, the opposite ends of which are provided with screw-threaded end closure plugs 27 and 28, respectively, each of which has an axial passage. A cylinder sleeve 29 is disposed within the housing in annularly spaced relation thereto and is provided with a set of wall openings 29A adjacent each of its opposite ends for establishing communication between the annular space 30 between the housing and cylinder sleeve and the opposite ends of the cylinder. The housing is provided with a nipple 26N for convenient attachment with a supply hose (not shown) extending from a source of volatile liquid which supplies liquid pressure to the filler head. Each end plug has an enlarged elevated central surface 27S and 28S for shouldered marginal engagement within the adjacent end of the cylinder sleeve to position and maintain the sleeve coaxially within the housing.

A piston 31 of any suitable construction is mounted for liquid-tight, sliding movement within the cylinder and, as illustrated, may be shaped to provide an annular space for receiving V-type packing rings 32 which encircle the piston and are held under suitable compression by a ring cap 33. An externally threaded coupling element 34 is fixed in and projects from the upper end of the piston to receive a lock nut 33N for fixing the ring cap 33 in position. The coupling element serves to anchor a piston rod 35 which projects in liquid-tight slideable relation through a seal ring packing 36 provided in the axial passage of the upper end closure plug 27.

The upper plug includes an internally threaded integral end collar 27C which mounts a stainless steel guide tube 37 slotted intermediately along its length as indicated at 37S. The piston rod 35 is movable lengthwise within the tube and engages with a carrier 38 confined within the upper end of the guide tube by a lock screw 39. A stop pin 40 rides in the carrier and projects transversely through the slots in the guide tube for locating engagement with a stop collar provided on the guide tube in the form of a pair of jamb nuts 41 which encircle and threadingly engage the guide tube. Abutment of the stop pin against the jamb nuts determines the upper limit of piston travel, and the jamb nuts are adjustable along the guide tube to vary the total piston travel that is permitted.

The space 43 in the cylinder sleeve beneath the lower face of the piston constitutes a metering chamber, the capacity of which is regulated by adjustment of the jamb nuts 41 along the guide tube 37. The lower end of the metering chamber is bounded by a disc-shaped end casting 44 (see FIGS. 1 and 7) having an axial discharge opening for the metering chamber and formed with a depending tubular support wall 44T having radial openings 44A to establish a liquid path from the cylinder sleeve openings to the discharge opening of the metering chamber. An annular valve seat 44S is formed on the underface of the disc in surrounding relation to the discharge opening thereof. A movable valve 45 has a lengthwise bore extending through its enlarged head 45H and its depending stem 45S to form a discharge passage for the metering chamber.

The movable valve 45 is mounted with its enlarged head 45H disposed for axial movement within the tubular depending wall of the end casting 44 and with its depending valve stem 45S extending in liquid-tight slideable relation through a seal ring packing 46 provided in the axial passage of the lower end closure plug 28. A flat rubber ring gasket 47 is mounted on the enlarged head of the movable valve for sealing engagement with the valve seat 44S on the end casting. The head end of the movable valve is provided with a valve seat 45V that is engageable with a polytetrafluoroethylene valve seat ring 48 carried in countersunk relation within the lower end of the piston 31. When the piston is at the lower end of its stroke, the seat 48 seals against the valve seat 45V on the movable valve to block the discharge passage extending through the movable valve.

Figure 2:
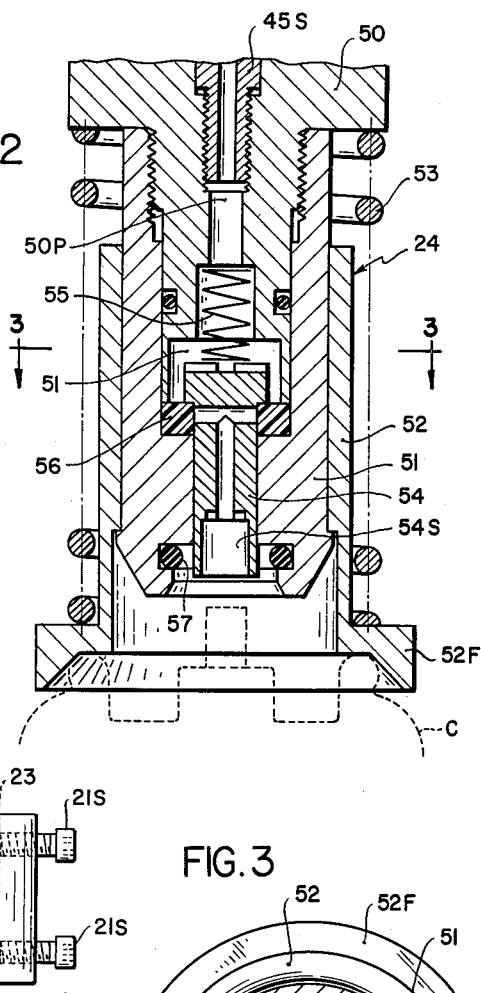
FIG. 2 is a detailed fragmentary enlarged vertical sectional view of an adapter unit employed in the pressure filler head.
Figure 3:
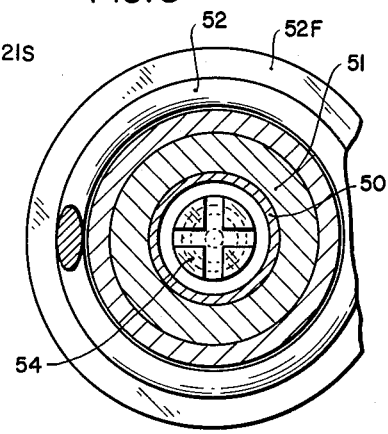
FIG. 3 is a detailed fragmentary horizontal sectional view through the adapter unit and is taken on the line 3—3 of FIG. 2.

The adapter 24 is shown in detail in the enlarged views of FIGS. 2 and 3 and has a two-piece body comprised of interfitting upper and lower elements 50 and 51, respectively, which are fixedly engaged in screw-threaded relation. Lengthwise passages 50P and 51P extend centrally through the body elements 50 and 51 to complete the discharge passage through the movable valve. The upper section of the passage in the lower element is enlarged to receive the reduced lower end of the upper element for connecting the passages of these elements in series. The depending stem 45S of the movable valve 45 is fixed in the top of the adapter body element 50 in open communication with the passage 50P thereof. The lower body element 51 is formed with an upwardly facing marginal external shoulder around its lower end cooperating with an internal marginal shoulder provided on a container-locating sleeve 52 which is mounted in slideable telescoping relation around the lower element 51. The locating sleeve is biased downwardly by an external coil spring 53 reacting between the upper element 50 and a marginal end flange 52F on the locating sleeve. A poppet valve 54 cooperates with a seal ring 56 fixed internally between the adapter body elements 50 and 51, in a position to encircle and seal the poppet valve 54. The construction of the head end of the poppet valve is detailed in FIG. 3.

In FIG. 2, the parts are illustrated in their normal position, and it will be clear that the discharge passage through the adapter is closed by the seal existing between the poppet valve 54 and seal ring 56. The lower end of the poppet valve is provided with a socket 54S shaped to receive the container valve, while the lower end of the locating sleeve 52 is shaped to receive the top of the container and the lower end of adapter body element 51 is formed with an internal annular mounting recess for a seal ring 57 that engages and seals against the container neck.

As mentioned previously, one function of the adapter is to normally block discharge from the filler head, such blocking being controlled by the poppet valve 54 in the discharge passage of the adapter. The poppet valve is shown in its normal closed position in FIGS. 1, 2 and 4 and is shown in its open, or unblocking position, in FIGS. 5 and 6. The large external coil spring 53 is selected to offer a high resistance to closure, the stiffness of this spring being sufficient to resist movement of the locating sleeve 52 upwardly along the adapter body element 51 until the adapter body goes solid against the pressure head, this relationship being established when the joint upward movement of the locating sleeve and adapter body carries the movable valve 45 against its seat 44S. An integral tubular depending guide collar 28C on the lower end closure plug guides the adapter in its vertical movement. In this intermediate position of the adapter elements which is shown in FIG. 4, the movable valve 45, through its sealing contact with the seat 44S, traps the charge of liquid in the metering chamber 43 and isolates the source of liquid from the discharge passage.

During the continued movement of the adapter parts from the position of FIG. 4 to the position of FIGS. 5 and 6, the container rim, by its engagement against the locating sleeve, forces this sleeve upwardly along the adapter body element 51, permitting the container neck to enter into sealing engagement with the O-ring 57 and permitting the container valve to lift the poppet valve 54 upwardly and unblock the discharge passage.

An important feature of the arrangement of the adapter unit resides in the fact that it first interrupts the supply of liquid from its source to the discharge passage and thereafter unseats the poppet valve to open the discharge passage. The arrangement is also such that the O-ring 57 housed within the lower end of the adapter body element 51 establishes sealing engagement around the neck of the container before the container valve completely unseats the poppet valve.

The full cycle of operation of the filler head may now be readily understood in connection with FIGS. 1, 2, 4, 5 and 6. In FIG. 1, the parts of the adapter are shown in the normal position which they assume prior to engagement with the container. In this position, the movable valve 45 is down and both ends of the cylinder are in communication with the pressurized liquid source through supply passages which include the nipple 26N, the annular space 30 between the cylinder and housing, and the wall openings 29A at opposite ends of the cylinder. Thus, the pressure of the liquid acts on opposite faces of the piston 31 and due to the differential areas resulting from the externally projecting piston rod 35, the force on the underneath face of the piston predominates and the piston is forced to its uppermost limit of travel as determined by engagement of the stop pin 40 with the jamb nuts 41. In moving the piston upwardly, the liquid progressively fills the metering chamber 43.

With a container in position beneath the filler head, the post 21 lowers the filler head downwardly to engage the adapter around the top of the container and lift the movable valve 45 against its seat 44S for isolating the charge of liquid within the metering chamber 43. Continued downward movement of the post 21 then causes the container valve to open the poppet valve 54 and unblock the discharge passage for allowing liquid to flow from the metering chamber through the movable valve 45 and adapter 24 to enter the container through its valve. As the liquid in the metering chamber begins to flow from under the piston 31, there is a reduction in pressure in the metering chamber resulting in the constant pressure on the top of the piston predominating and forcing the piston down until the metering chamber is empty. At the lower end of the piston's stroke, the valve seat 48 on the piston engages the seat 45V on the movable valve to seal off the discharge passage until the filler head moves out of engagement with the container. When the operating post rises and carries the pressure head upwardly, the poppet valve 54 drops down to block off the discharge passage and then the movable valve 45 drops down to restore communication of the pressurized liquid to the metering chamber at the lower side of the piston. The differential areas on the piston faces again establish a resultant force for moving the piston upwardly and trapping another metered charge of liquid in the metering chamber for discharge into the next container during the next filling cycle.

A filler head of modified construction is shown in FIG. 8, and corresponding parts bear identical reference numbers. In the head construction shown in FIGS. 1–7, attention should be paid to the accurate positioning of the head upon its operating post in order to match it with the height of the container to be filled. In FIG. 8, the mounting bracket for attaching the head to the post is modified in that it includes a ring-like spring seat 22A engageable with a lock ring 60 encircling the container, while the main body 22 of the bracket is slideable along the housing or casing 26 and is retained by a lock ring 61. The bracket 22 is recessed to provide mounting pockets for a plurality of springs 22S which react between the parts 22 and 22A. The operating post is again secured fast to the mounting bracket 22 and upon its downward movement for lowering the filler head into engagement with a container, the springs 22S cushion the impact of the head and prevent crushing of the container. With this arrangement, the container height adjustment is not critical and containers of somewhat different height can be filled without individual adjustment of the mounting position of the filler head.

In the construction of FIG. 8, the piston 31 is shorter and is sealed with a single encircling O-ring 32' mounted in a suitable peripheral notch provided about the periphery of the piston. The valve seat 48 carried on the piston has a shouldered configuration mating with a shouldered passage in the piston to lock the seat firmly in place. The lower end closure plug 28 has an upstanding tubular wall 28T formed with wall openings 28A establishing communication from the annular space 30 to the lower end of the metering chamber, while the end closure disc 44 for the lower end of the metering chamber is gripped between the wall 28T and the lower end of the cylinder 29 with the disc 44 centering the lower end of the cylinder 29 with respect to the end closure plug 28. The upper end closure plug 27 is formed with a depending tubular wall 27T having wall openings 27A establishing communication from the annular space 30 to the upper face of the piston and having shouldered engagement with the upper end of the cylinder to center it within the housing.

The adapter per se is essentially the same, though the upper adapter body element 50 is provided with a guide slot 50S for a set screw 59 and is provided with a pair of guide pins 58 for confining the adapter against rotation during its vertical movement relative to the housing.

The functioning of the filler head of FIG. 8 is essentially identical with that of the embodiment of FIGS. 1–7, and reference may be had to the previous description of the operation.

The foregoing description and the drawings are given merely to explain and illustrate the invention and the manner in which it may be performed, and the invention is not to be limited thereto, except insofar as the appended claims are so limited since those skilled in the art who have this disclosure before them will be able to make modifications and variations therein without departing from the scope and spirit of the invention.

We claim:

1. A pressure filler head for filling a metered quantity of pressurized volatile liquid into a container through its valve, comprising a dispenser having a chamber of predetermined size for receiving in its entirety a metered charge of volatile liquid under pressure and having a normally closed discharge passage, means for connecting a source of volatile liquid under pressure in continuous communication with said dispenser operable when said dispenser is out of engagement with said container for supplying said liquid to said dispenser to establish said metered charge in said chamber, and means responsive to actuating engagement against said container and valve for isolating said chamber and the metered charge therein from said source and for opening said discharge passage into said container valve to discharge said metered charge into said container through said discharge passage and valve.

2. The method of filling a metered quantity of pressurized volatile liquid into a container through its valve, said method comprising supplying said volatile liquid under pressure to a dispenser of predetermined metered capacity for filling said dispenser to said capacity, and thereafter bringing said valve and container into engagement with said dispenser to establish communication therebetween and to condition said dispenser for discharge through said valve while maintaining said supply of volatile liquid under pressure for actuating said dispenser to discharge the metered capacity of liquid contained therein, and disengaging said container from said dispenser to terminate discharge therefrom while maintaining the supply of said volatile liquid under pressure to said dispenser for again filling said dispenser to said metered capacity.

3. A pressure filler head comprising a housing provided with a cylinder having a discharge outlet adjacent one end thereof, a piston slideable in said cylinder and having opposed piston faces of differential area, with the piston face adjacent said outlet being larger and defining, with said cylinder, a metering chamber opening through said outlet, an inlet connection supplying pressurized fluid to said cylinder on both sides of said piston, normally open valve means controlling communication between said inlet connection and said metering chamber, normally closed valve means sealing said outlet, and means for opening said normally closed valve and means for closing said normally open valve means to discharge a predetermined quantity of fluid from said chamber.

4. The arrangement of claim 3 wherein said head has adjustable stop means reacting between said piston and housing to limit travel of said piston in a chamber-expanding direction.

5. A pressure filler head comprising a housing provided with a cylinder having a discharge outlet adjacent one end thereof, a piston slideable in said cylinder and having opposed piston faces of differential area, with the piston face adjacent said outlet being larger and defining, with said cylinder, a chamber opening through said outlet, an inlet connection supplying pressurized fluid to said cylinder on both sides of said piston, normally open valve means controlling communication between said inlet connection and said metering chamber and responsive to operative engagement of said head with a container to terminate such communication, and normally closed valve means sealing said outlet and responsive to engagement of said head with a container to open said outlet.

6. The arrangement of claim 5 wherein said head has adjustable stop means reacting between said piston and housing to limit travel of said piston in a chamber-expanding direction.

7. A pressure filler head comprising means forming a cylinder having an opening adjacent one end thereof communicating with a discharge passage that terminates in a discharge outlet, a piston slideable in said cylinder and having opposed piston faces of differential area, with the piston face adjacent the discharge passage end of the cylinder being larger and defining, in conjunction with said cylinder, a chamber discharging through said passage and outlet successively, inlet connection means for supplying pressurized fluid to the region of the cylinder adjacent the smaller piston face and to said cylinder opening for entry to the region of the cylinder adjacent the larger piston face, normally open valve means controlling communication between said inlet connection and said discharge passage, normally closed valve means sealing said discharge passage, and means for opening said normally closed valve means and for closing said normally open valve means to discharge a predetermined quantity of fluid from said chamber.

8. A pressure filler head comprising means forming a cylinder having an opening adjacent one end thereof communicating with a discharge passage that terminates in a discharge outlet, a piston slideable in said cylinder and having opposed piston faces of differential area, with the piston face adjacent the discharge passage end of the cylinder being larger and defining, in conjunction with said cylinder, a chamber discharging through said passage and outlet successively, inlet means for supplying pressurized fluid to the region of the cylinder adjacent the smaller piston face and to said cylinder opening for entry to the region of the cylinder adjacent the larger piston face, normally open valve means controlling communication between said inlet means and said discharge passage and responsive to operative engagement of said head with a container to terminate such communication, and normally closed valve means sealing said discharge passage and responsive to engagement of said head with a container to open said discharge passage.

9. A pressure filler head comprising a housing provided with a cylinder having a discharge outlet adjacent one end thereof, a piston slideable in said cylinder and having a guide rod projecting in an axial direction through said housing at the opposite end of the cylinder, with the effective area of the piston face adjacent the outlet being larger than the effective area of the piston face adjacent the rod, said piston partitioning the cylinder into a head chamber through which said rod extends and a metering chamber that discharges through said outlet, an inlet connection for supplying pressurized fluid to both the head chamber and metering chamber, normally open valve means controlling communication between said inlet connection and said metering chamber, normally closed valve means sealing said outlet, and means for opening said normally closed valve means and for closing said normally open valve means to discharge a predetermined quantity of fluid from said chamber.

10. A pressure filler head comprising a housing provided with a cylinder having a discharge outlet adjacent one end thereof, a piston slideable in said cylinder and having a guide rod projecting in an axial direction through said housing at the opposite end of the cylinder, with the effective area of the piston face adjacent the outlet being larger than the effective area of the piston face adjacent the rod, said piston partitioning the cylinder into a head chamber through which said rod extends and a metering chamber that discharges through said outlet, an inlet connection for supplying pressurized fluid to both the head chamber and metering chamber, normally open valve means controlling communication between said inlet connection and said metering chamber and responsive to operative engagement of said head with a container to terminate such communication, and normally closed valve means sealing said outlet and responsive to engagement of said head with a container to open said outlet.

11. A pressure filler head comprising means forming a cylinder having an opening adjacent one end thereof in communication with a discharge passage that terminates in a discharge outlet, a piston slideable in said cylinder and having a guide rod projecting in an axial direction through the opposite end of said cylinder such that the piston face adjacent the discharge passage end of the cylinder is larger than the piston face associated with the guide rod and defines, in conjunction with said cylinder, a chamber discharging through said passage and outlet successively, connection means for supplying pressurized fluid to the region of the cylinder adjacent the smaller piston face and to said cylinder opening for entry to the region of the cylinder adjacent the larger piston face, normally open valve means controlling communication between said connection means and said discharge passage, normally closed valve means sealing said discharge passage, and means for opening said normally closed valve means and for closing said normally open valve means to discharge a predetermined quantity of fluid from said chamber.

12. A pressure filler head comprising a housing, a cylinder within the housing and having an opening adjacent one end thereof communicating with a discharge passage extending through the housing and terminating in a discharge outlet, a guide tube fixed to the housing and extending externally thereof along the axis of said cylinder and at the opposite end thereof, a piston slideable in said cylinder and having a guide rod projecting in an axial direction through said housing and guide tube such that the piston face adjacent the discharge passage end of the cylinder is larger than the piston face associated with the guide rod and defines, in conjunction with said cylinder, a chamber discharging through said discharge passage and discharge outlet successively, stop means in said guide tube and engageable with said guide rod to limit travel of said piston towards said guide tube, inlet connection means for supplying pressurized fluid to the region of the cylinder adjacent the smaller piston face and to said cylinder opening for entry to the region of the cylinder adjacent the larger piston face, normally open valve means controlling communication between said inlet connection means and said discharge passage, normally closed valve means sealing said discharge passage, and means for opening said normally closed valve means and for closing said normally open valve means to discharge a predetermined quantity of fluid from said chamber.

13. A pressure filler head comprising a housing, end closure plugs mounted in said housing at opposite ends thereof and each having an opening therethrough, a cylinder liner disposed within said housing to provide a cylinder and engaged between said end closure plugs to provide between said housing and liner an annular space in communication with said cylinder at opposite ends thereof, a closure disc at one end of said cylinder liner and having an opening therethrough surrounded by a valve seat, a movable valve having a discharge passage extending endwise therethrough and shiftable in the opening of the adjacent end closure plug to seal against said valve seat such that the discharge passage through said valve communicates only with the region of the cylinder adjacent said disc, a piston slideable in said cylinder liner and having a guide rod projecting through the opening of the other of said end closure plugs such that the piston face adjacent the discharge passage end of the cylinder is larger than the piston face associated with the guide rod and defines, in conjunction with said cylinder, a metering chamber opening through said discharge passage, connection means for supplying pressurized fluid to the region of the cylinder adjacent the smaller piston face and to the region of said disc opening for entry into the region of the cylinder adjacent the larger piston face, an adapter body external of said housing and fixed to said movable valve for joint movement therewith relative to said housing, said body forming a passage extension of said discharge passage of said movable valve, and a valve in said passage extension to normally block the same and movable in said body to unblock said passage extension.

14. A pressure filler head comprising a vertically elongated housing, upper and lower end closure plugs in opposite ends of said housing and each having an opening therethrough, a vertically extending cylinder liner disposed within said housing to provide a cylinder and engaged between said end closure plugs to provide between said housing and liner an annular space in communication with said cylinder at opposite ends thereof, a closure disc at the lower end of said cylinder liner and having an opening extending vertically therethrough and a valve seat on the underside of said disc and surrounding said disc opening, a movable valve comprising an enlarged head and depending head having a discharge passage extending endwise therethrough, said valve having its stem shiftable vertically in the opening of the lower end plug and having its head shiftable between said lower end plug and said disc to seal against said valve seat such that said discharge passage, through said valve, communicates only with the lower end of said cylinder, a guide tube fixed to said upper end closure plug and extending externally thereof along the axis of said cylinder and above said housing, a piston slideable in said cylinder liner and having a guide rod projecting through said upper end closure plug and said guide tube such that the lower piston face is larger than the upper piston face and defines, in conjunction with said cylinder and closure disc, a metering chamber communicating with said discharge passage, an inlet connection for supplying pressurized fluid to said annular space, stop means in said guide tube and engageable with said guide rod to limit travel of said piston towards said guide tube, an adapter body external of said housing and fixed to said movable valve for joint movement therewith relative to said housing, said body forming a passage extension of said discharge passage of said movable valve, and a valve in said passage extension to normally block the same and movable in said body to unblock said passage extension.

15. A pressure filler head comprising a housing provided with a cylinder having an opening adjacent one end thereof and a valve seat surrounding said opening, a piston slideable in said cylinder and having a guide rod projecting through the opposite end of said housing such that the piston face adjacent said opening is larger and defines, with said cylinder, a metering chamber communicating with said opening, an inlet connection supplying pressurized fluid to opposite ends of said cylinder with said fluid being supplied to said metering chamber through said opening, a valve having a discharge passage extending endwise therethrough and shiftable in said housing between a normal open position and a closed position wheerin said valve engages said valve seat to isolate said inlet connection from said metering chamber while maintaining communication between said metering chamber and said discharge passage, an adapter body external of said housing and fixed to said valve for joint movement therewith relative to said housing, said body having a passage extension for the discharge passage, and a valve in said passage extension to normally block the same and movable in said body to unblock said passage extension.

16. A pressure filler head comprising a housing provided with a cylinder having an opening adjacent one end thereof and a valve seat surrounding said opening, a piston slideable in said cylinder and having a guide rod projecting through the opposite end of said housing such that the piston face adjacent said opening is larger and defines, with said cylinder, a metering chamber communicating with said opening, an inlet connection supplying pressurized fluid to opposite ends of said cylinder with said fluid being supplied to said metering chamber through said opening, a valve having a discharge passage extending endwise therethrough and shiftable in said housing between a normal open position and a closed position wherein said valve engages said valve seat to isolate said inlet connection from said metering chamber while maintaining communication between said metering chamber and said discharge passage, an adapter body external of said housing and fixed to said valve for joint movement therewith relative to said housing, said body having a passage extension for the discharge passage, a valve in said passage extension to normally block the same and movable in said body to unblock said passage extension, a locating sleeve in shiftable telescoping relation over said adapter body and having shouldered engagement therewith, and resilient means reacting between said body and said locating sleeve to yieldingly urge said sleeve downwardly into shouldered engagement, said resilient means offering greater resistance to movement than the first named valve such that, upon engagement of said sleeve with a container, the first named valve operates prior to the second named valve.

References Cited in the file of this patent

UNITED STATES PATENTS

| | | |
|---|---|---|
| 2,613,023 | Reich | Oct. 7, 1952 |
| 2,684,805 | McBean | July 27, 1954 |